(12) United States Patent
Yoshida

(10) Patent No.: US 6,492,958 B2
(45) Date of Patent: Dec. 10, 2002

(54) ADAPTIVE ANTENNA RECEPTION APPARATUS

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/935,798

(22) Filed: Aug. 24, 2001

(65) Prior Publication Data

US 2002/0045432 A1 Apr. 18, 2002

(30) Foreign Application Priority Data

Aug. 25, 2000 (JP) ........................ 2000/256549

(51) Int. Cl.[7] ............................................. H01Q 23/00
(52) U.S. Cl. .................... 343/853; 342/375; 342/377; 370/335
(58) Field of Search ................. 343/853, 893; 342/372, 373, 374, 375, 377; 370/335, 336, 337; H01Q 23/00

(56) References Cited

U.S. PATENT DOCUMENTS 6,320,540 B1 * 11/2001 Meredith ..................... 342/377
6,188,373 B1 * 2/2002 Martek ........................ 343/893
6,208,294 B1 * 3/2002 Kobayakawa et al. ...... 342/373
6,385,181 B1 * 5/2002 Tsutsui et al. .............. 370/335

OTHER PUBLICATIONS

"Pilot Symbol–Assisted Decision–Directed Coherent Adaptive Array Diversity for DS–CDMA Mobile Radio Reverse Link", IEICE Trans. vol. E80–A, pp. 2445–2454, Dec. 1997.
"Performance of Coherent Adaptive Antenna Array Diversity Receiver Using the Common Antenna Weights for Rake Combined Paths for W–CDMA Reverse Link", Technical Report of IEICE, RCS Aug. 1998.

* cited by examiner

Primary Examiner—Tho Phan
(74) Attorney, Agent, or Firm—Whitham, Curtis & Christofferson, PC

(57) ABSTRACT

An adaptive antenna reception apparatus includes a reference signal level determination section, reception level detection sections, and beam formers. The reference signal level determination section determines the level of a reference signal for generating an error signal used for antenna adaptive control on the basis of a reception level of each antenna before beam forming. The reception level detection sections calculate antenna weighting factors for the respective paths on the basis of the multiplex signals received through the respective antennas and the error signal output from the reference signal level determination section. The beam formers receive the received multiplex signals and form antenna directivity beams for the respective paths in accordance with the antenna weighting factors output from the reception level detection sections.

10 Claims, 9 Drawing Sheets

ADAPTIVE ANTENNA RECEPTION APPARATUS

BACKGROUND OF THE INVENTION

The present invention relates to an adaptive antenna reception apparatus for receiving code division multiple access (CDMA) signals and adaptively forming antenna directivity beams to receive a desired user signal while suppressing other user interference signals.

The CDMA scheme has the potential of increasing the subscriber capacity and is expected as a radio access scheme for a next-generation mobile communication cellular system. On the base station receiving side, however, a problem arises in terms of interference with other user signals due to simultaneous access with the same carrier. As a method of eliminating such interference, a method using an array antenna is available.

An array antenna receives signals through a plurality of antennas and performs weighted combining of complex numbers. With this operation, the amplitude and phase of the signal received through each antenna are controlled to form a directivity beam so as to receive a desired user signal, and other user interference signals are suppressed. An adaptive array antenna is an apparatus for forming such a directivity beam by adaptive control.

FIG. 6 shows a conventional adaptive antenna reception apparatus. Referring to FIG. 6, the adaptive antenna reception apparatus has L path processing sections 107-1 to 107-L corresponding to the number of paths in accordance with multipath propagation channels in a mobile communication environment. The adaptive antenna reception apparatus forms directivity beams for the respective L paths to receive signals therefrom, and combines the reception signals to obtain a high-quality reception signal. The path processing sections 107-1 to 107-L have the same arrangement. Each section is comprised of a beam former 101 and adaptive control section 106.

The beam former 101 receives a despread signal obtained at each path timing by using the spreading code of a desired user, and performs weighted combining of complex numbers to form a directivity beam for each path.

A combiner 102 combines outputs from the respective beam formers 101. A determination unit 103 determines a transmission signal with the highest possibility of being a reception signal, and outputs a user determination symbol. A switch 104 is switched to output a known reference signal as a reference signal to a subtracter 105 if the known reference signal is present and to output a determination signal as a reference signal to the subtracter 105 if no known reference signal is present. The subtracter 105 generates an error signal by subtracting the reception signal sent from the combiner 102 from the reception signal sent from the switch 104.

The adaptive control section 106 obtains an antenna weighting factor used by each beam former 101 by adaptive control using an error signal and a reception signal before beam forming. Adaptive control, minimum mean square error (MMSE) control is generally used. As adaptive update algorithms for antenna weighting factors using error signal, LMS (Least Mean Square), NLMS (Normalized LMS), and RLS (Recursive Least Square) algorithm are known.

FIG. 9 shows the gains of beam patterns formed by the beam formers for the respective paths. FIG. 9 shows a case of two paths. In this case, high gains are directed to the respective path directions of desired signals, while the gains in the interference signal directions are suppressed low. In an array antenna using adaptive control, a beam is directed to a desired signal direction, and a point (null) where the gain is extremely low is directed to an interference direction to maximize the reception SINR (Signal to Interference and Noise Ratio).

Other conventional adaptive antenna reception apparatuses are disclosed in "Pilot Symbol-Assisted Decision-Directed Coherent Adaptive Array Diversity for DS-CDMA Mobile Radio Reverse Link", IEICE Trans. vol. E80-A, pp. 2445–2454, December 1997 (reference 1) and "Performance of Coherent Adaptive Antenna Array Diversity Receiver Using the Common Antenna Weights for Rake Combined Paths for W-CDMA Reverse Link", Technical Report of IEICE, RCS 99–100, August 1998 (reference 2).

FIG. 7 shows the basic arrangement of this scheme. A beam former 121 receives a despread signal obtained at each path timing by using the spreading code of a desired user, and performs weighted combining of complex numbers to form a directivity beam for each path. A combiner 122 combines outputs from the respective beam formers 121. A determination unit 123 determines a transmission signal with the highest possibility of being a reception signal.

A switch 124 is switched to output a known reference signal as a reference signal to a multiplier 125 if the known reference signal is present and to output a determination signal as a reference signal to the multiplier 125 if no known reference signal is present. The multiplier 125 multiplies the reference signal output from the switch 124 and the reference signal level output from an averaging section 130. A subtracter 126 generates an error signal by subtracting the reception signal from the output from the multiplier 125.

An adaptive control section 127 obtains an antenna weighting factor used by the beam former 121 by adaptive control using the error signal output from the multiplier 125 and the reception signal before beam forming. According to the above reference, antenna weighting factors are updated by using the NLMS algorithm.

A reference signal level A(n) is calculated on the basis of the transmission channel estimation value output from the beam former 121. A reception level detection section 128 detects the reception level of each path from a corresponding transmission channel estimation value, and outputs it to an adder 129. The adder 129 adds the reception levels of the respective paths output from the reception level detection section 128. The averaging section 130 averages the sum level output from the adder 129 and outputs the resultant value to the multiplier 125. The presence/absence of the averaging section 130 or its averaging time is arbitrarily determined.

FIG. 8 shows an example of the reception level detection section 128. Referring to FIG. 8, an amplitude detection section 141 detects the absolute value (amplitude) of a transmission channel estimation value (complex number). A squaring section 142 calculates the square (power) of an output from the amplitude detection section 141. The reference signal level A(n) is given by $$A(n) = \sum_{n=0}^{N_{AVR}} \sum_{i=0}^{L-1} |h(i,n)|^2 \qquad (1)$$

where $N_{AVR}$ is the averaging time of the averaging section 130.

The conventional adaptive antenna reception apparatus exhibits excellent steady-state characteristics owing to low-speed MMSE adaptive control in which antenna weighting factors are long-term-averaged. In a high-speed fading environment or the like, amplitude and phase variations due to fading cannot be corrected. For this reason, to correct phase variations, a transmission channel correction section is connected to the output terminal of each beam former.

With regard to reception level variations, however, when a prescribed value is used as a reference signal, a level difference is produced between the reception signal and the reference signal, resulting in an error in the desired signal itself. This leads to unstable operation. If high-speed transmitting power control (TPC) is used together, a desired signal is suppressed in a short period of time in the process of initial convergence, and TPC diverges.

According to a method of determining a reference signal in accordance with a reception level, when a reception level after beam forming is used as a reference signal, the reference signal level drops as the beam gain decreases, as in the prior art. For this reason, the gain decreases for a long term because of the absence of power that adjusts the gain direction of a beam. In this method, therefore, the capability of tracking a change in the arriving direction of a desired signal may deteriorate.

This tracking capability can be improved by averaging reference signal levels. This operation amounts to setting the averaging time $N_{AVR}$ of signal levels to be long. If this averaging time is set to be long, variations in reception level cannot be quickly handled. This method is therefore equivalent to the method using a prescribed value.

SUMMARY OF THE INVENTION

It is an object of the present invention to provide an adaptive antenna reception apparatus which can stabilize adaptive control by quickly changing a reference signal in accordance with a reception level.

In order to achieve the above object, according to the present invention, there is provided an adaptive antenna reception apparatus for receiving multiplex signals from a plurality of users with the same carrier through a plurality of antennas, and receiving a desired user signal by adaptively forming an antenna directivity beam while suppressing other user interference signals, comprising determination means for determining a level of a reference signal for generating an error signal used for antenna adaptive control on the basis of a reception level of each antenna before beam forming, a plurality of adaptive control means for calculating antenna weighting factors for the respective paths on the basis of the multiplex signals received through the respective antennas and the error signal output from the determination means, and a plurality of beam formers for receiving the received multiplex signals and forming antenna directivity beams for the respective paths in accordance with the antenna weighting factors output from the adaptive control means.

DESCRIPTION OF THE PREFERRED EMBODIMENTS

Figure 1:
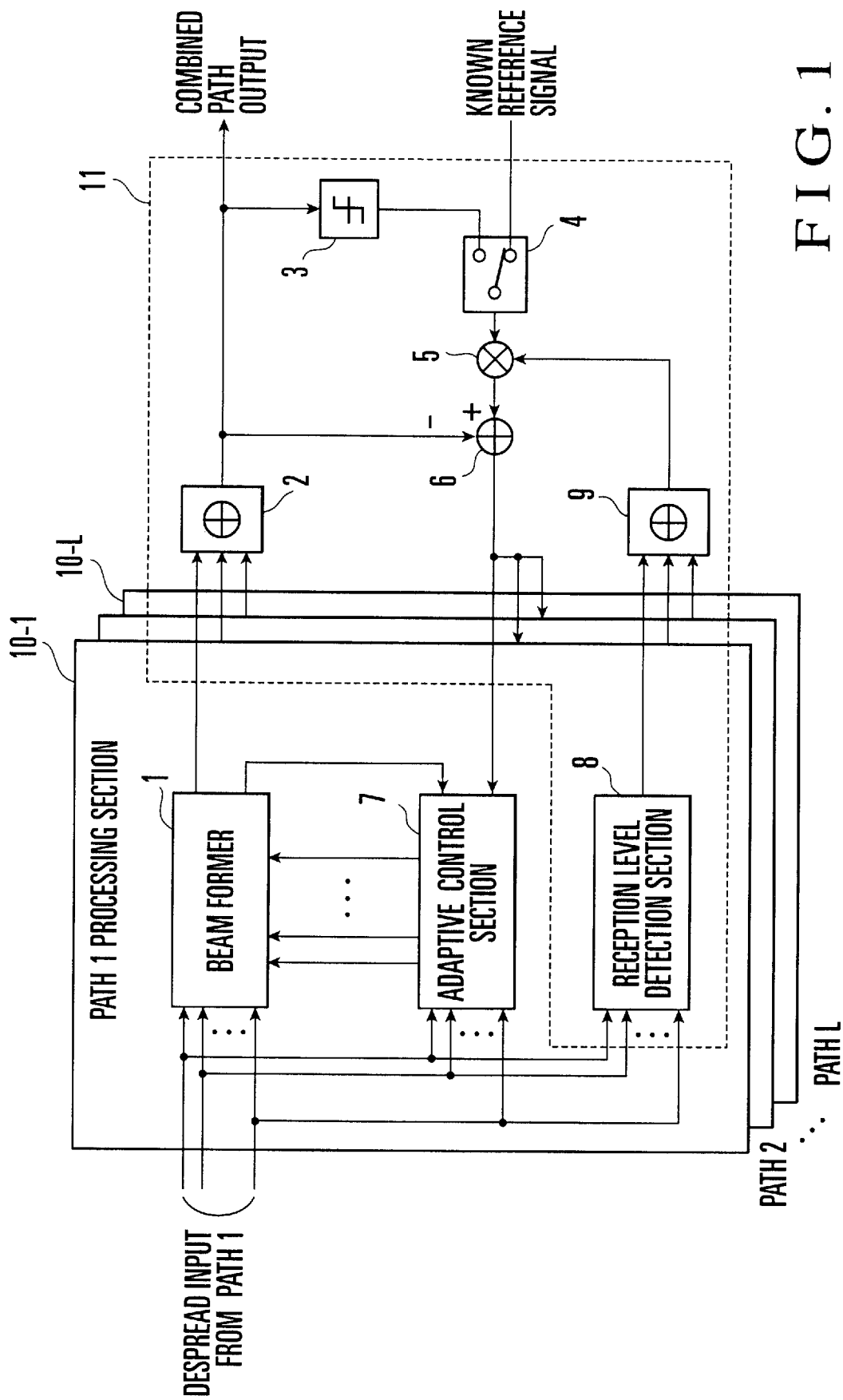
FIG. 1 is a block diagram showing an adaptive antenna reception apparatus according to the first embodiment of the present invention.

FIG. 1 shows an adaptive antenna reception apparatus according to the first embodiment of the present invention. Referring to FIG. 1, the adaptive antenna reception apparatus has L path processing sections 10-1 to 10-L corresponding to the number of paths in accordance with multipath propagation channels in a mobile communication environment. The adaptive antenna reception apparatus forms directivity beams for the respective L paths to receive signals therefrom, and combines the reception signals to obtain a high-quality reception signal. The path processing sections 10-1 to 10-L have the same arrangement. Each section is comprised of a beam former 1, adaptive control section 7, and reception level detection section 8.

The beam former 1 receives a despread signal obtained at each path timing by using the spreading code of a desired user, and performs weighted combining of complex numbers to form a directivity beam for each path.

A combiner 2 combines outputs from the respective beam formers 1. A determination unit 3 determines a transmission signal with the highest possibility of being a reception signal, and outputs a user determination symbol. A switch 4 is switched to output a known reference signal as a reference signal to a multiplier 5 if the known reference signal is present and to output a determination signal as a reference signal to the multiplier 5 if no known reference signal is present. The multiplier 5 multiplies the reference signal output from the switch 4 and an output from a combiner 9, and outputs the resultant value to a subtracter 6. The subtracter 6 generates an error signal by subtracting the output sent from the combiner 2 from the output sent from the multiplier 5.

The adaptive control section 7 obtains an antenna weighting factor used by each beam former by adaptive control using the error signal output from the subtracter 6 and a reception signal before beam forming. For example, in adaptive control, antenna weighting factor $W_{NLMS}(i,j,n)$ (where i is the path number, j is the antenna number, and n is the symbol number) obtained by using the NLMS algorithm is updated by using equation (2):

$$W_{NLMS}(i, j, n+1) = W_{NLMS}(i, j, n) + \frac{\lambda_{NLMS}}{P(i, n)} X(i, j, n) h_n(i, n) e^*(n) \quad (2)$$

where x(i,j,n) is the despread signal of each antenna reception signal, P(i,n) is the total power of the despread signals of the respective antennas for the respective paths, $h_n(i,n)$ is the transmission channel estimation value normalized with an amplitude of 1, which is calculated by using the transmission channel estimation value supplied from each beam former 1, and $\lambda_{NLMS}$ is the step size of NLMS.

As methods of updating the antenna weighting factor in the adaptive control section 7, various algorithms and modifications thereof are available in addition to the method indicated by equation (2). However, they are not directly relevant to the gist of the present invention, and hence a detailed description of these methods will be omitted. In equation (2), e(n) represents an error signal, which is given by $$e(n)=A(n)Z_R(n)-Z(n) \quad (3)$$

where z(n) is the reception signal, $Z_R(n)$ is the reference signal (the determination signal or known reference signal), and A(n) is the reference signal level.

The reference signal level A(n) is calculated on the basis of the signal received by each antenna and input to the beam former 1. The reception level detection section 8 detects the reception level of each path from the transmission channel estimation value for each antenna and outputs the detected level to the combiner 9. The combiner 9 combines the reception levels of the respective paths and outputs the resultant value to the multiplier 5.

Reference numeral 11 denotes a reference signal level determination section for determining the level of a reference signal for generating an error signal used for antenna adaptive control. The reference signal level determination section 11 is comprised of the combiners 2 and 9, determination unit 3, switch 4, multiplier 5, subtracter 6, and reception level detection section 8.

Figure 2:
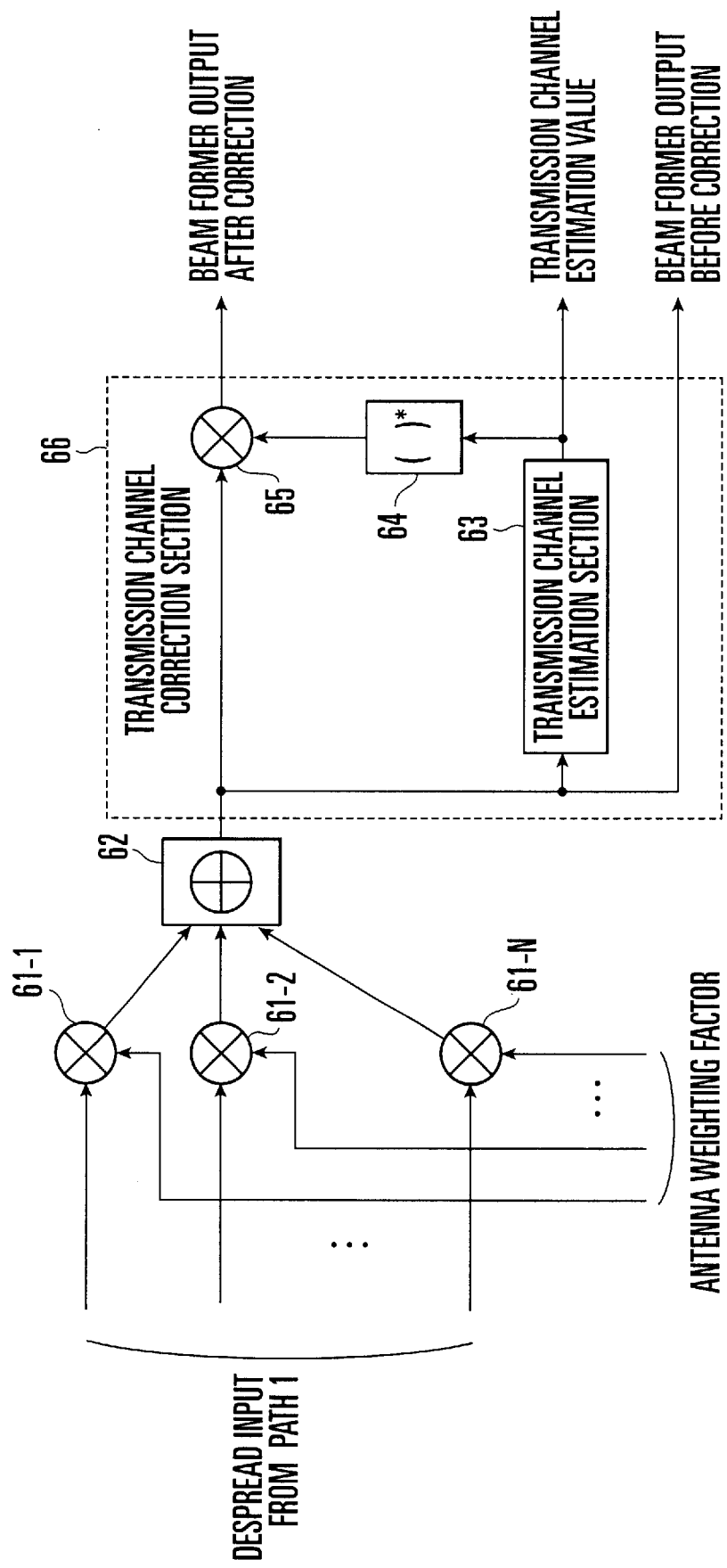
FIG. 2 is a block diagram of a beam former in FIG. 1.

FIG. 2 shows an example of the beam former 1. The beam former 1 is basically comprised of complex multipliers 61-1 to 61-N (N is the number of antenna elements) and a combiner 62. A transmission channel correction section 66 includes a transmission channel estimation section 63, complex conjugate section 64, and complex multiplier 65, and corrects amplitude and phase variations in a transmission channel by using the reception signal output from the combiner 62, which has undergone beam forming.

This function is not required when the transmission channel variation is slow. In this case, amplitude and phase variations in the transmission channel can be corrected by the antenna weighting factor itself. If the transmission channel variation is fast, the antenna weighting factor updating speed based on adaptive control is too low to perform satisfactory transmission channel correction. For this reason, a transmission channel correction function is independently prepared, and beam forming based on long-term averaging is performed to track only the arriving direction of a signal without performing transmission channel correction for a desired signal using an antenna weighting factor.

Although the transmission channel correction section 66 is not directly associated with the beam forming function, the beam former 1 includes this section for the sake of descriptive convenience. The transmission channel estimation value output from the transmission channel estimation section 63 is also used in the adaptive control section 7.

Figure 3:
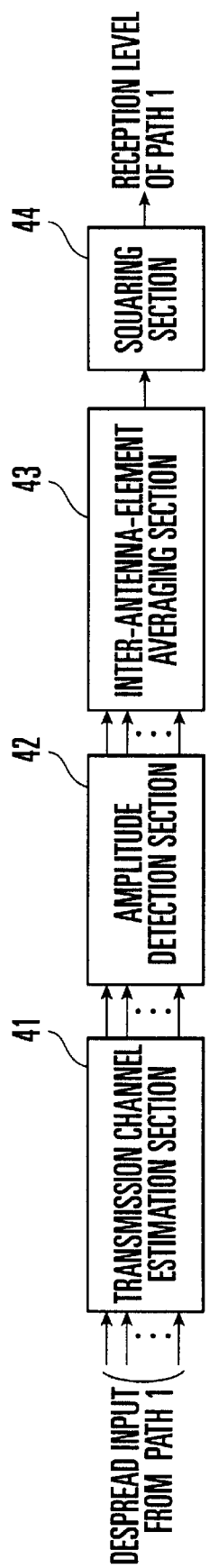
FIG. 3 is a block diagram of a reception level detection section in FIG. 1.

FIG. 3 shows an example of the reception level detection section 8. A transmission channel estimation section 41 performs transmission channel estimation for each antenna element on the basis of an input despread signal to obtain a transmission channel estimation value (complex number). An amplitude detection section 42 detects the absolute value (amplitude) of the transmission channel estimation value (complex number) output from the transmission channel estimation section 41. An inter-antenna-element averaging section 43 averages the reception levels of the respective antennas, which are the outputs from the amplitude detection section 42, between the antennas. A squaring section 44 calculates the square (power) of the output from the inter-antenna-element averaging section 43. The reference signal level A(n) is given by $$A(n) = \sum_{i=1}^{L}\left(\frac{1}{N}\sum_{j=1}^{N}|h_{EL}(i,j,n)|\right)^2 \quad (4)$$

where $h_{EL}(i,j,n)$ is the transmission channel estimation value (complex number) for each antenna element. The processing performed by the transmission channel estimation section 41 and inter-antenna-element averaging section 43 need not always be performed for all the elements N, and is designed in consideration of the SINR improvement characteristics and computation amount.

According to this embodiment, a reference signal is multiplied by the signal level of each antenna before beam forming, and the reception level of each antenna before beam forming is not influenced by the beam gain. Therefore, this level is preferably used as a reference for a reference signal level. Although the SINR of the signal received by each antenna before beam forming is considerably low, the SINR can be improved by averaging the levels between the antenna elements.

Figure 4:
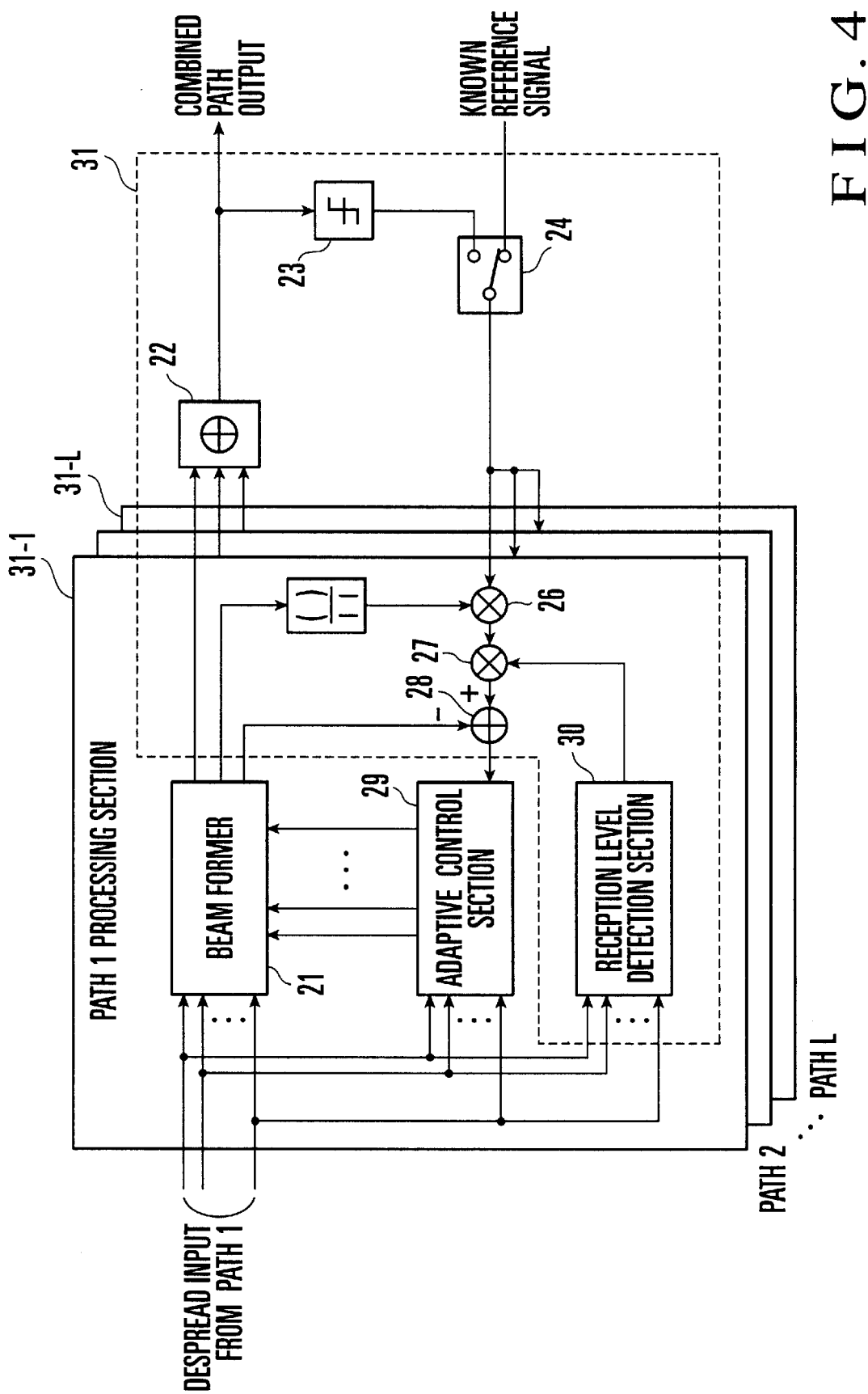
FIG. 4 is a block diagram showing an adaptive antenna reception apparatus according to the second embodiment of the present invention.

FIG. 4 shows an adaptive antenna reception apparatus according to the second embodiment of the present invention. The second embodiment differs from the first embodiment in that an error signal for adaptive control is generated for each path. More specifically, each of processing sections 31-1 to 31-L includes a normalizing section 25, multipliers 26 and 27, and subtracter 28 in addition to a beam former 21, adaptive control section 29, and reception level detection section 30. The beam former 21, a combiner 22, a determination unit 23, and a switch 24 have the same functions as those of the beam former 1, combiner 2, determination unit 3, and switch 4 in the first embodiment.

The normalizing section 25 normalizes the transmission channel estimation value output from the beam former 21 with an amplitude of 1 and outputs the resultant value to the multiplier 26. The multiplier 26 multiplies an output (normalized transmission channel estimation value) from the normalizing section 25 and an output (reference signal) from the switch 24. The multiplier 27 multiplies an output (a reference signal having undergone phase correction) from the multiplier 26 and an output (the level of a reference signal) from the reception level detection section 30. The subtracter 28 generates an error signal by subtracting the output sent (reference signal) from the multiplier 27 from a reception signal (a beam former output before correction in FIG. 2) from each path.

The adaptive control section 29 obtains an antenna weighting factor used by the beam former 21 by adaptive control using an error signal and the signal received by each antenna before beam forming. In an example of adaptive control sections 29-1 to 29-L, an antenna weighting factor $W_{NLMS}(i,j,n)$ (where i is the path number, j is the antenna number, and n is the symbol number) obtained by using the NLMS algorithm is updated by $$W_{NLMS}(i,j,n+1) = W_{NLMS}(i,j,n) + \frac{\lambda_{NLMS}}{P(i,n)}X(i,j,n)e^*(i,n) \quad (5)$$

where x(i,j,n) is the despread signal of each antenna reception signal, P(i,n) is the total power of the despread signals of the respective antennas for the respective paths, and $\lambda_{NLMS}$ is the step size of NLMS.

As methods of updating the antenna weighting factor in the adaptive control section 29, various algorithms and modifications thereof are available in addition to the method indicated by equation (5). However, they are not directly relevant to the gist of the present invention, and hence a detailed description of these methods will be omitted. In equation (5), e(n) represents an error signal, which is given by $$e(n) = A(i,n) \, h_n(i,n) Z_R(n) - z(i,n) \quad (6)$$

where z(i,n) is the reception signal from each path, i.e., the beam former output before phase correction, $Z_R(n)$ is a reference signal as a determination signal or known reference signal, and A(i,n) is the reference signal level of each path.

The reference signal level A(i,n) is calculated on the basis of the signal received by each antenna and input to the beam former 21. A reception level detection section 30 detects the reception level of each path from the transmission channel estimation value for each antenna.

Reference numeral 31 denotes a reference signal level determination section for determining the level of a reference signal for generating an error signal used for antenna adaptive control on the basis of the reception level of each antenna before beam forming. The reference signal level determination section 31 is comprised of the combiner 22, determination unit 23, switch 24, normalizing section 25, multipliers 26 and 27, subtracter 28, and reception level detection section 30.

Figure 5:
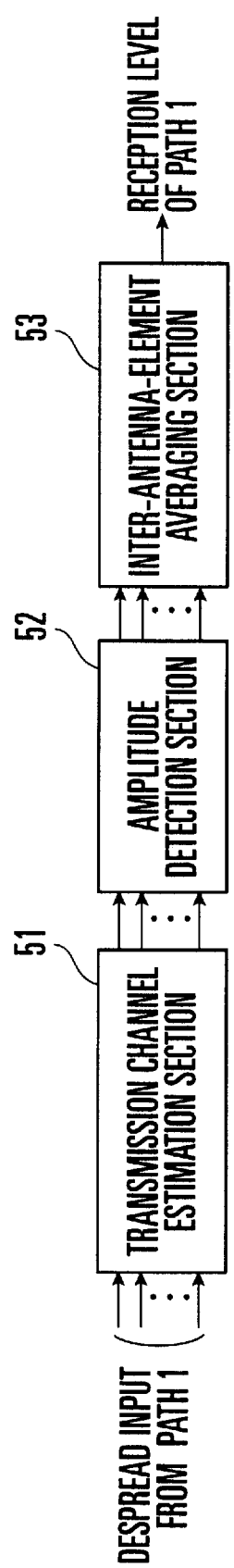
FIG. 5 is a block diagram of a reception level detection section in FIG. 4.
Figure 6:
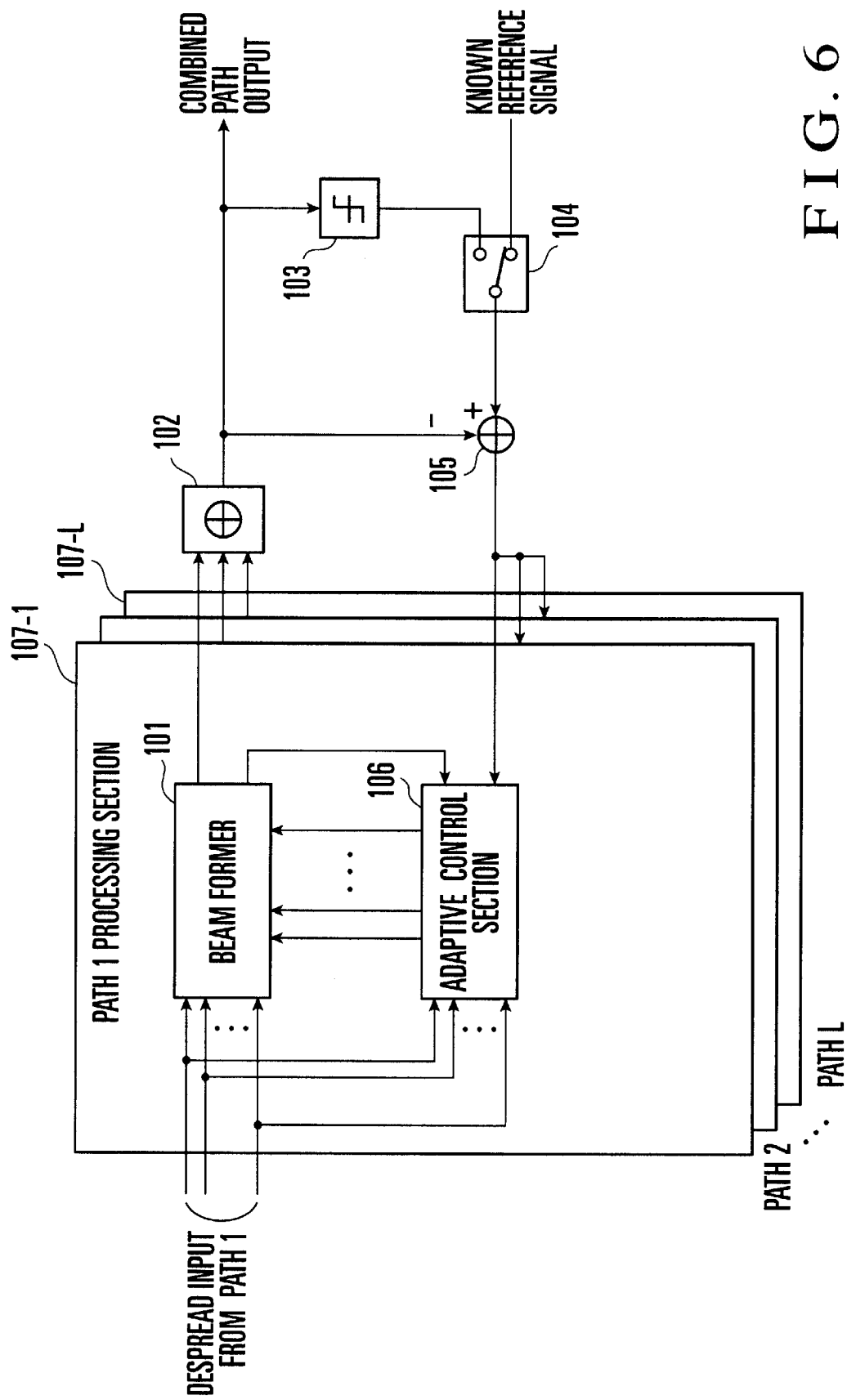
FIG. 6 is a block diagram showing a conventional adaptive antenna reception apparatus.
Figure 7:
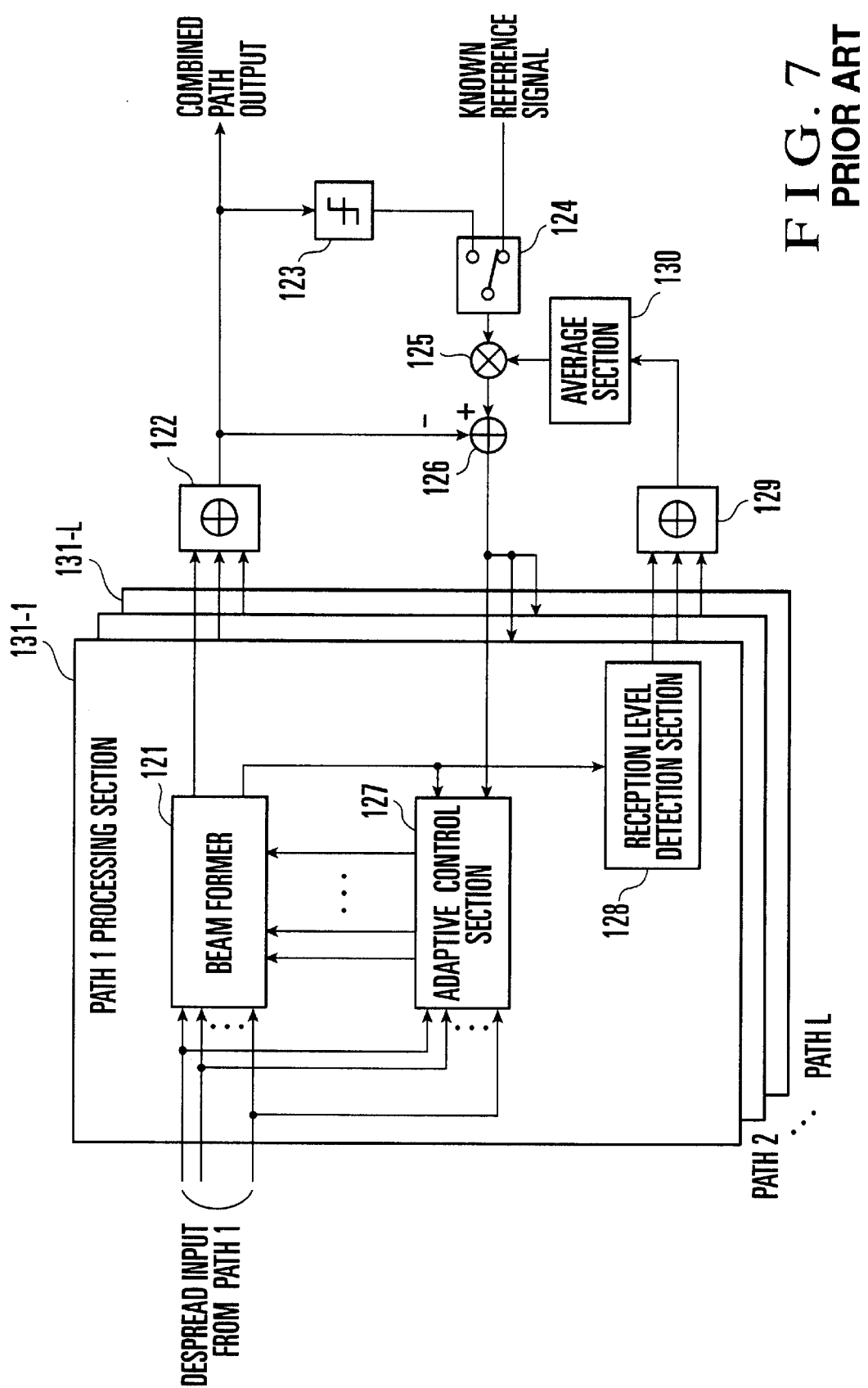
FIG. 7 is a block diagram showing another conventional adaptive antenna reception apparatus.
Figure 8:
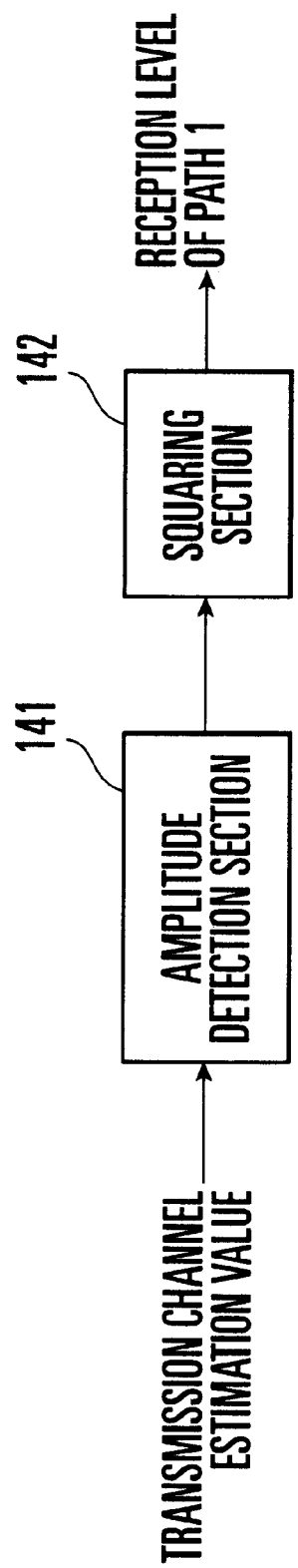
FIG. 8 is a block diagram showing a reception level detection section in FIG. 7.
Figure 9:
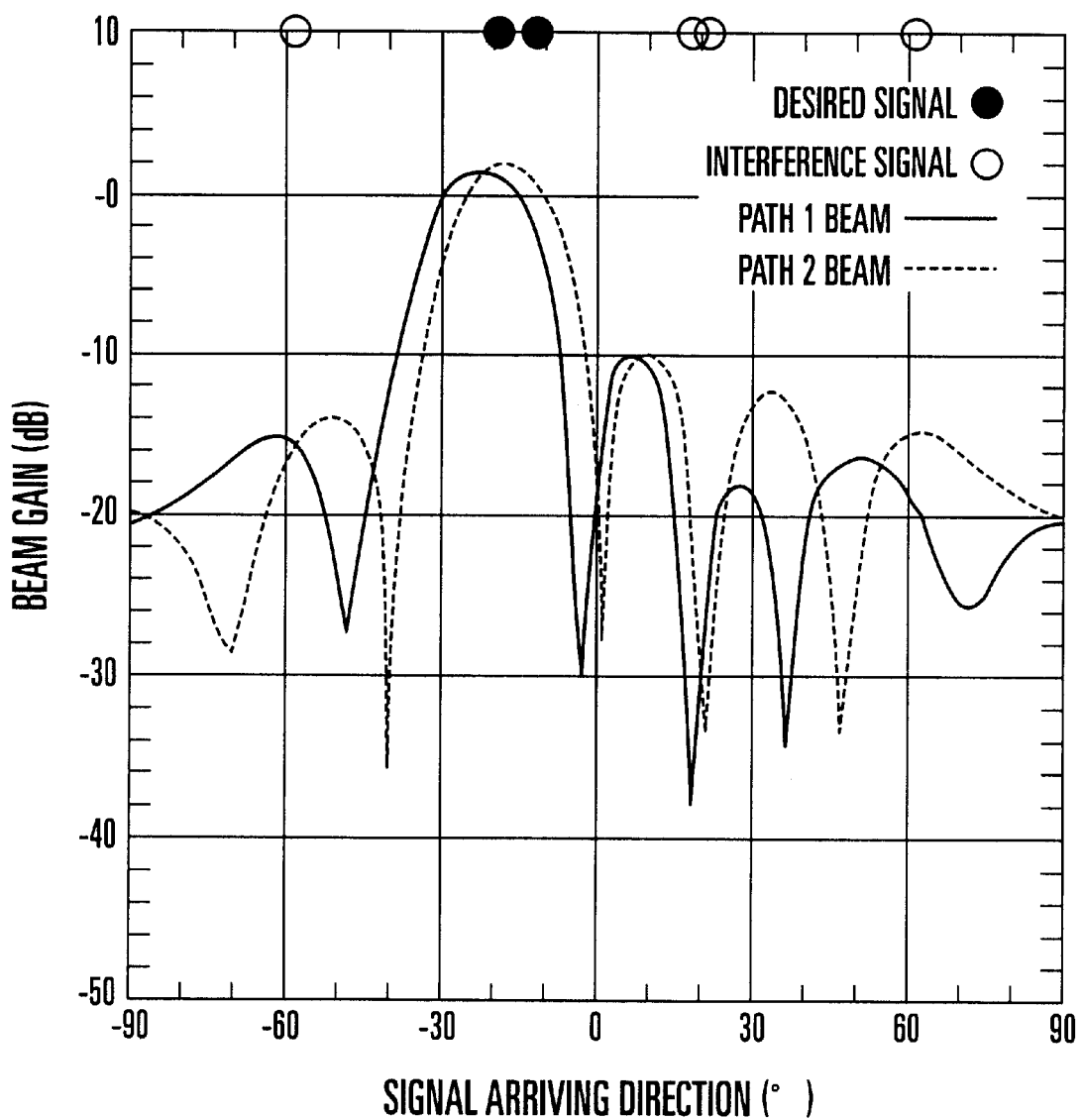
FIG. 9 is a graph showing an example of a beam pattern in an adaptive antenna reception apparatus.

FIG. 5 shows an example of the reception level detection section 30. A transmission channel estimation section 51 performs transmission channel estimation for each antenna element on the basis of an input despread signal to obtain a transmission channel estimation value (complex number). An amplitude detection section 52 detects the absolute value (amplitude) of the transmission channel estimation value (complex number) output from the transmission channel estimation section 51. An inter-antenna-element averaging section 53 averages the reception levels of the respective antennas, which are the outputs from the amplitude detection section 52, between the antennas, and outputs the resultant value to the multiplier 27. The reference signal level A(i,n) of each path is given by $$A(i,n) = \frac{1}{N} \sum_{j=1}^{N} |h_{EL}(i,j,n)| \quad (7)$$

where $h_{EL}(i,j,n)$ is the transmission channel estimation value (complex number) for each antenna element. The processing performed by the transmission channel estimation section 51 and inter-antenna-element averaging section 53 need not always be performed for all the elements N, and is designed in consideration of the SINR improvement characteristics and computation amount.

The present invention is especially effective when transmission channel variations are fast, and adaptive control is too slow to perform satisfactory transmission channel correction, i.e., the transmission channel correction section 66 is independently prepared for the beam former 1. However, the present invention is not limited to this, and may be applied to a case where transmission channel variations can be corrected by an antenna weighting factor itself, i.e., the beam former 1 does not include the transmission channel correction section 66 (the adaptive antenna has a basic arrangement).

In each embodiment described above, a CDMA signal is used as a multiplex signal. However, the present invention is not limited to a case where a CDMA signal is used. For example, the present invention can also be applied to a case where an FDMA (Frequency Division Multiple Access) signal, TDMA (Time Division Multiple Access) signal, or the like, other than a CDMA signal, is used as a reception signal.

As has been described above, according to the present invention, since a reference signal is multiplied by the signal level of each antenna before beam forming, the reference signal is quickly changed in accordance with the reception level in a fading environment or the like, thereby stabilizing adaptive control.

When high-speed TPC is used together, in particular, the present invention can prevent the phenomenon in which a desired signal is suppressed in the process of initial convergence, and TPC diverges. This allows adaptive control to exert its intrinsic tracking capability with respect to a change in the arriving direction of a desired signal.

What is claimed is:

1. An adaptive antenna reception apparatus for receiving multiplex signals from a plurality of users with the same carrier through a plurality of antennas, and receiving a desired user signal by adaptively forming an antenna directivity beam while suppressing other user interference signals, comprising:

determination means for determining a level of a reference signal for generating an error signal used for antenna adaptive control on the basis of a reception level of each antenna before beam forming;

a plurality of adaptive control means for calculating antenna weighting factors for the respective paths on the basis of the multiplex signals received through the respective antennas and the error signal output from said determination means; and a plurality of beam formers for receiving the received multiplex signals and forming antenna directivity beams for the respective paths in accordance with the antenna weighting factors output from said adaptive control means.

2. An apparatus according to claim 1, wherein the multiplex signal is a code division multiple access (CDMA) signal.

3. An apparatus according to claim 2, wherein said determination means comprises:

first combining means for combining beam former outputs from said beam formers corresponding to the respective paths;

determination means for determining an output from said first combining means as a transmission signal;

switch means for selectively switching a determination signal output from said determination means and a known reference signal to output the signal as a reference signal;

a plurality of reception level detection means for detecting a reception level for each path on the basis of a received despread signal;

second combining means for combining reception levels of the respective paths which are output from said reception level detection means;

multiplication means for multiplying a reference signal level output from said second combining means and a reference signal from said switch means; and subtraction means for generating an error signal by subtracting an output from said multiplication means from an output from said first combining means.

4. An apparatus according to claim 3, wherein said reception level detection means comprises:

transmission channel estimation means for estimating a transmission channel for each antenna for each path;

amplitude detection means for calculating an absolute value of an output from said transmission channel estimation means;

amplitude averaging means for averaging outputs from said amplitude detection means between antenna elements; and squaring means for squaring an output from said amplitude averaging means.

5. An apparatus according to claim 2, wherein said determination means comprises:

combining means for combining beam former outputs from said beam formers corresponding to the respective paths;

determination means for determining an output from said combining means as a transmission signal;

switch means for switching a determination signal output from said determination means and a known reference signal to output the signal as a reference signal;

a plurality of reception level detection means for detecting a reception level for each path on the basis of the despread signal;

a plurality of multiplication means for multiplying reception levels of the respective paths, output from said reception level detection means, and the reference signal output from said switch means; and a plurality of subtraction means for generating error signals for the respective paths by subtracting outputs from said multiplication means from outputs from said beam formers.

6. An apparatus according to claim 5, wherein said reception level detection means comprises:

transmission channel estimation means for estimating a transmission channel for each antenna for each path;

amplitude detection means for calculating an absolute value of an output from said transmission channel estimation means; and amplitude averaging means for averaging outputs from said amplitude detection means between antenna elements.

7. An apparatus according to claim 1, wherein said determination means determines a reference signal level on the basis of a sum total of path reception levels of the respective antennas before beam forming.

8. An apparatus according to claim 1, wherein said determination means determines a reference signal level for each path on the basis of a path reception level of each antenna before beam forming.

9. An adaptive antenna reception apparatus for receiving code division multiple access (CDMA) signals through a plurality of antennas, and receiving a desired user signal by adaptively forming an antenna directivity beam while suppressing other user interference signals, comprising:

a plurality of beam formers for receiving despread signals received through the respective antennas and forming antenna directivity beams for the respective paths;

a first combination unit for combining beam former outputs from said beam formers for the respective paths;

a determination section for determining an output from said combining unit as a transmission signal;

a switch for switching a determination signal output from said determination section and a known reference signal to output thee signal as a reference signal;

a plurality of reception level detection sections for detecting reception levels for the respective paths on the basis of received despread signals;

a second combining unit for combining reception levels of the respective paths which are output from said reception level detection sections;

a multiplier for multiplying a reference signal level output from said second combining unit and a reference signal from said switch;

a subtracter for generating an error signal by subtracting an output from said first combining unit from an output from said multiplier; and a plurality of adaptive control sections for calculating an antenna weighting factor on the basis of a received despread signal and an error signal output from said substracter and outputting the factor to said beam former.

10. An adaptive antenna reception apparatus for receiving code division multiple access (CDMA) signals through a plurality of antennas, and receiving a desired user signal by adaptively forming an antenna directivity beam while suppressing other user interference signals, comprising:

a plurality of beam formers for receiving despread signals received through the respective antennas and forming antenna directivity beams for the respective paths;

a combining unit for combining beam former outputs from said beam formers for the respective paths;

a determination section for determining an output from said combining unit as a transmission signal;

a switch for switching the determined signal and a known reference signal to output the signal as a reference signal;

a plurality of reception level detection sections for detecting reception levels for the respective paths on the basis of received despread signals;

a plurality of multipliers for multiplying the reception levels of the respective paths, output from said reception level detection sections, and the reference signal output from said switch as a reference signal level;

a plurality of subtracters for generating error signals for the respective paths by subtracting outputs from said multipliers from outputs from said beam formers; and a plurality of adaptive control sections for calculating antenna weighting factors on the basis of received despread signals and the error signals output from said subtracters and outputting the factors to said beam formers.

* * * * *